(12) United States Patent
Allen et al.

(10) Patent No.: US 11,829,765 B2
(45) Date of Patent: Nov. 28, 2023

(54) COMPUTER MECHANISM FOR ANALYTIC ORCHESTRATION AND ENTITLED EXECUTION

(71) Applicant: INTERNATIONAL BUSINESS MACHINES CORPORATION, Armonk, NY (US)

(72) Inventors: Corville O. Allen, Morrisville, NC (US); Pratul Gupta, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 17/218,976

(22) Filed: Mar. 31, 2021

(65) Prior Publication Data

US 2022/0318018 A1 Oct. 6, 2022

(51) Int. Cl.
| | | |
|---|---|---|
| *G06F 17/30* | (2006.01) | |
| *G06F 9/38* | (2018.01) | |
| *G06F 9/50* | (2006.01) | |
| *G06N 7/00* | (2023.01) | |
| *H04L 9/06* | (2006.01) | |
| *H04L 9/00* | (2022.01) | |

(52) U.S. Cl.
CPC ............ *G06F 9/3836* (2013.01); *G06F 9/505* (2013.01); *G06N 7/00* (2013.01); *H04L 9/0643* (2013.01); *H04L 9/50* (2022.05)

(58) Field of Classification Search
CPC ........ G06F 16/13; G06F 16/24; G06F 16/156; G06N 3/00; G06N 5/00; G05B 13/00
USPC .............................................. 706/12, 14, 45
See application file for complete search history.

(56) References Cited

U.S. PATENT DOCUMENTS

| | | | |
|---|---|---|---|
| 10,659,219 B1* | 5/2020 | Ganeshmani | H04L 9/0637 |
| 10,678,597 B2 | 6/2020 | Wang | |
| 11,538,105 B2* | 12/2022 | Reses | H04L 9/0825 |
| 2014/0012594 A1* | 1/2014 | Slanetz | G06Q 10/10 |
| | | | 705/2 |
| 2018/0205555 A1 | 7/2018 | Watanabe | |
| 2019/0164151 A1 | 5/2019 | Doney | |
| 2019/0281065 A1 | 9/2019 | Xia | |
| 2020/0357084 A1 | 11/2020 | Lerato Hunn | |

(Continued)

FOREIGN PATENT DOCUMENTS

| | | |
|---|---|---|
| EP | 2410483 A1 | 1/2012 |
| WO | 2017136579 A1 | 8/2017 |

(Continued)

OTHER PUBLICATIONS

Allen, et al., "Computer Mechanism for Analytics Outcome Transparency," Application and Drawings, Filed on Mar. 31, 2021, 57 Pages, Related U.S. Appl. No. 17/218,548.

(Continued)

*Primary Examiner* — Hung D Le
(74) *Attorney, Agent, or Firm* — Teddi E. Maranzano

(57) ABSTRACT

A mechanism is provided to orchestrates entitled execution of a set of analytics. The mechanism retrieves an analytic entry from an immutable data record source and identifies an analytic associated with the analytic entry, and an associated dataset. The analytic and the dataset are encrypted using an owner's key. The mechanism decrypts the analytic using a decryption key and executes the analytic based on the decrypting.

17 Claims, 10 Drawing Sheets

(56) References Cited

U.S. PATENT DOCUMENTS

| | | |
|---|---|---|
| 2021/0256635 A1 | 8/2021 | Umit |
| 2022/0318209 A1 | 10/2022 | Allen |

FOREIGN PATENT DOCUMENTS

| | | |
|---|---|---|
| WO | 2019222742 A1 | 11/2019 |
| WO | 202035831 A1 | 2/2020 |

OTHER PUBLICATIONS

Deloitte, "Value-Based Contracting Services: Life science innovation and health care reimbursement models," Datasheet [online], [accessed on Feb. 23, 2021], 5 pages, Retrieved from the Internet: <URL: https://www2.deloitte.com/us/en/pages/life-sciences-and-health-care/solutions/value-based-contracting-services.html>.

Garrison, Jr., et al., "Performance-Based Risk-Sharing Arrangements—Good Practices for Design, Implementation, and Evaluation: Report of the ISPOR Good Practices for Performance-Based Risk-Sharing Arrangements Task Force," Value in Health, 2013, pp. 703-719, vol. 16, Issue 5, DOI: 10.1016/j.jval.2013.04.011, Retrieved from the Internet: <URL: https://www.sciencedirect.com/science/article/pii/S1098301513018111>.

Guardtime, "Value-Based Contracting: Solving Real Healthcare Challenges With Blockchain," Guardtime.com Datasheet [online], [accessed on Feb. 23, 2021], 4 pages, Retrieved from the Internet: <URL: https://guardtime.com/health/value-based-contracting>.

Herington, The outcomes-based reimbursement environment, Pharmaceutical Commerce, Mar. 16, 2019 [accessed on Aug. 10, 2020], 7 pages, Retrieved from the Internet: <URL: https://guardtime.com/health/value-based-contracting>.

IBM Watson Health, "Advancing outcomes-based contracting. Overcoming barriers of trust, knowledge and data management," IBM.com, 2019, 4 pages, Retrieved from the Internet: <URL: https://www.ibm.com/downloads/cas/LM7DZABP>.

IBM: List of IBM Patents or Patent Applications Treated as Related (Appendix P), Dated Herewith, 2 pages.

Kaufmanhall, "Value Based Contracting," Healthy Research Educational Trust Datasheet [online], Jul. 2013, 34 pages, Retrieved from the Internet: <URL: http://www.hpoe.org/Reports-HPOE/Value-Based_Contracting_KaufHall_2013.pdf>.

Transmittal Form PTO/SB/21 Dated Herewith, 2 Pages.

* cited by examiner

COMPUTER MECHANISM FOR ANALYTIC ORCHESTRATION AND ENTITLED EXECUTION

BACKGROUND

The present application relates generally to an improved data processing apparatus and method and more specifically to mechanisms for leveraging cognitive computing, artificial intelligence, analytics, and blockchain for analytic execution.

A blockchain is a decentralized, distributed, and oftentimes public (or permissioned), digital ledger consisting of records called blocks that is used to record transactions across many computers so that any involved block cannot be altered retroactively, without the alteration of all subsequent blocks. This allows the participants to verify and audit transactions independently and relatively inexpensively. A blockchain database is managed autonomously using a peer-to-peer network and a distributed timestamping server. They are authenticated by mass collaboration powered by collective self-interests. Such a design facilitates robust workflow where participants' uncertainty regarding data security is marginal. A blockchain has been described as a value-exchange protocol. A blockchain can maintain title rights because, when properly set up to detail the exchange agreement, it provides a record that compels offer and acceptance.

A smart contract is a computer program or a transaction protocol that is intended to automatically execute, control, or document legally relevant events and actions according to the terms of a contract or an agreement. The objectives of smart contracts are the reduction of need in trusted intermediators, arbitrations, and enforcement costs, fraud losses, as well as the reduction of malicious and accidental exceptions. Once a smart contract is deployed, it cannot be updated. In technical terms, a smart contract comprises executable program code deployed on a blockchain network allowing all participants in the network (i.e., the blockchain peers) to execute the same code, allowing the peers to reach consensus and store the results in blockchain ledgers.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

Embodiments of the invention are directed to mechanisms (methods, computer program products, and systems) for orchestrating entitled execution of a set of analytics.

In an embodiment, the mechanism retrieves an analytic entry from an immutable data record source, identifies an analytic associated with the analytic entry, wherein the analytic is encrypted using an owner's key, decrypts the analytic using a decryption key, and executes the analytic based on the decrypting.

In an embodiment, the mechanism additionally identifies a dataset associated with the analytic. The dataset is encrypted using an owner's key. The mechanism decrypts the dataset using a decryption key and executes the analytic based on the decrypting of the dataset.

In an embodiment, the mechanism additionally finds a directed acyclic graph (DAG) workflow execution associated with an immutable data record. The DAG includes vertices including a vertex corresponding to the analytic. The mechanism verifies a vertex order and analytic function using the DAG.

In an embodiment, the mechanism additionally activating the analytic.

In an embodiment, the mechanism identifies a dataset associated with the analytic. The dataset is encrypted using an owner's key. The mechanism decrypts the dataset using a decryption key and finds a directed acyclic graph (DAG) workflow execution associated with an immutable data record. The DAG comprises vertices including a vertex corresponding to the analytic. The Mechanism verifies a vertex order and analytic function using the DAG, activates the analytic, and executes the analytic based on the decrypting of the analytic and based on decrypting the dataset.

In an embodiment, the mechanism additionally iteratively executes for all analytics in a set of analytics according to the workflow execution of the DAG using authenticated and authorized data access credentials.

In an embodiment, the mechanism's execution of the analytic fails based on the decrypting failing.

In an embodiment, the mechanism's execution of the analytic fails based on the decrypting of the dataset failing.

In an embodiment, the mechanism additionally activates the associated analytic for execution with data access credentials. The activating configures credentialed access to edge data.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
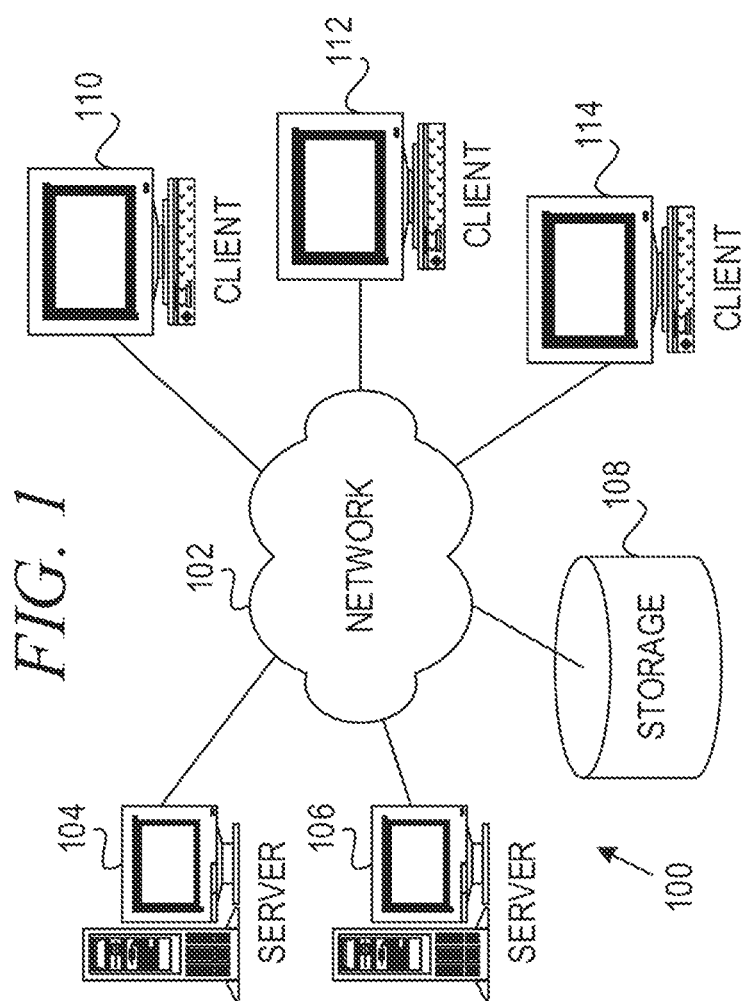
FIG. 1 is an example diagram of a distributed data processing system in which aspects of the illustrative embodiments may be implemented.

Embodiments of the invention can best be understood in light of the following description.

In Value Based Agreements, there is a contract, usually between two entities, to determine an outcome. Then, based on that outcome, some business benefit is performed to either or both parties. In most cases, the business benefit is a payment, a rebate, or some premium to an originally agreed-upon price. This can be a percentage or a discreet amount depending on the contract.

The contract defines certain rules. Sometimes, these rules are in the form of inclusion and exclusion criteria; in this case, the contract outcome is produced by applying some metric associated with the inclusion and exclusion criteria to a data set.

Computerized contract execution can be facilitated by using smart contracts to manage execution of analytics related to the contract. An analytic is a routine or function written in software code (programming instructions) used to discover, interpretate, and communicate meaningful patterns in data. An analytic may entail applying data patterns towards effective decision making. In the context of a smart contract, an analytic refers to a set of programming instructions that apply contract rules to determine a contract outcome by processing validated data.

In an embodiment of the invention, analytics execution is performed on a computer system using a permissioned blockchain network. The computer system defines an "owner" role: a system, process, profile, user, or other entity that has privileged or permissioned access (hereinafter, privileged access) to certain assets in the computer system. Privileged access generally refers to the permission to load, store, delete, or process assets. An asset generally refers to analytics and data (including edge data) on which they operate. The assets are stored on a data store either on or off the blockchain. Edge data refers to data stored on a data store external to a central processing system. The central processing system may not automatically access the data without proper access credentials. Therefore, a challenge created by this architecture is that the edge data (and the analytics that operate on it) must be able both to access the data but also to do so in an entitled manner, because the analytics and the data/edge data cannot be left unsecured.

Therefore, an important limitation in existing systems is that analytic execution (including the data the analytic is applied to) is not secure; it is not orchestrated and not entitled. In practical terms, this means that the system has no mechanism to restrict execution of an analytic to its owner and to prevent others from executing the analytic. The same is true with respect to the data on which the analytic operates; the system does not restrict access to data to those who should not have access to that data. Where access is provided, it is not orchestrated (i.e., providing access to the right/correct/appropriate asset at the right/correct/appropriate time).

Embodiments of the invention solve the problem of how to configure computers in novel and non-obvious ways; and not any problem of how to arrange or execute contractual relationships between any parties. As such, embodiments of the invention are directed to improvements in cognitive computing, blockchain (and databases), and analytics, among others.

Embodiments of the invention provide orchestration and entitlement verification mechanisms before execution an analytic (which applies metrics to a dataset) and before committing and writing outcomes of analytic execution to a blockchain network ledger.

Figure 3:
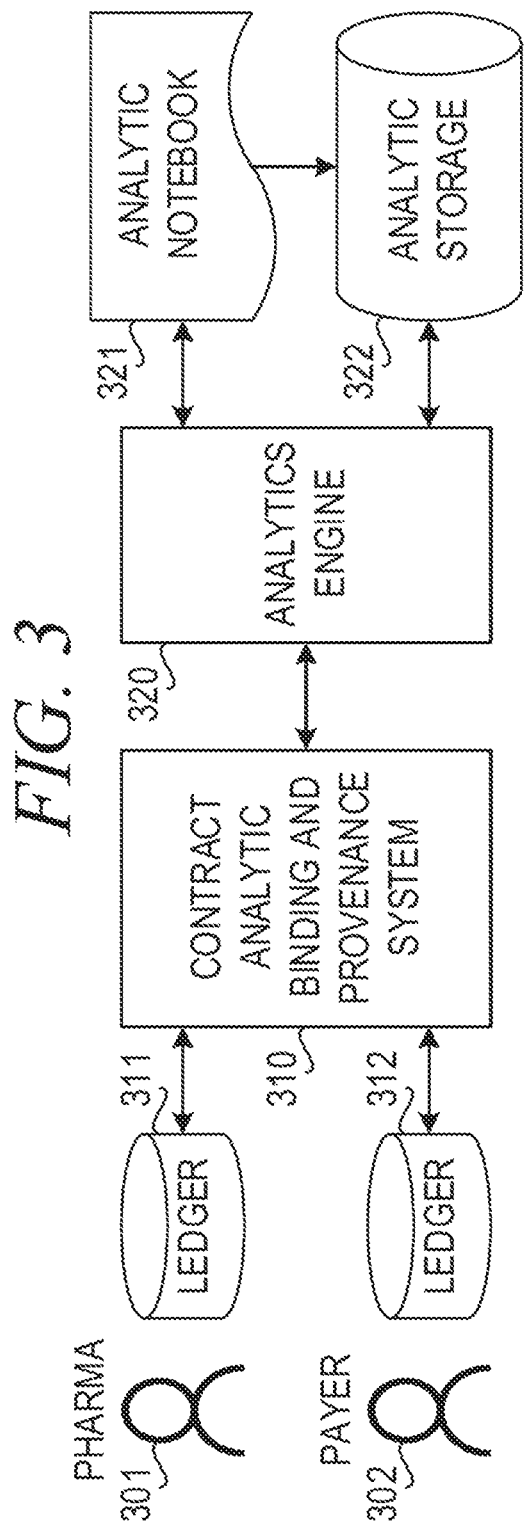
FIG. 3 is a block diagram illustrating operation of a system for contract analytic binding and provenance in accordance with an illustrative embodiment.
Figure 4:
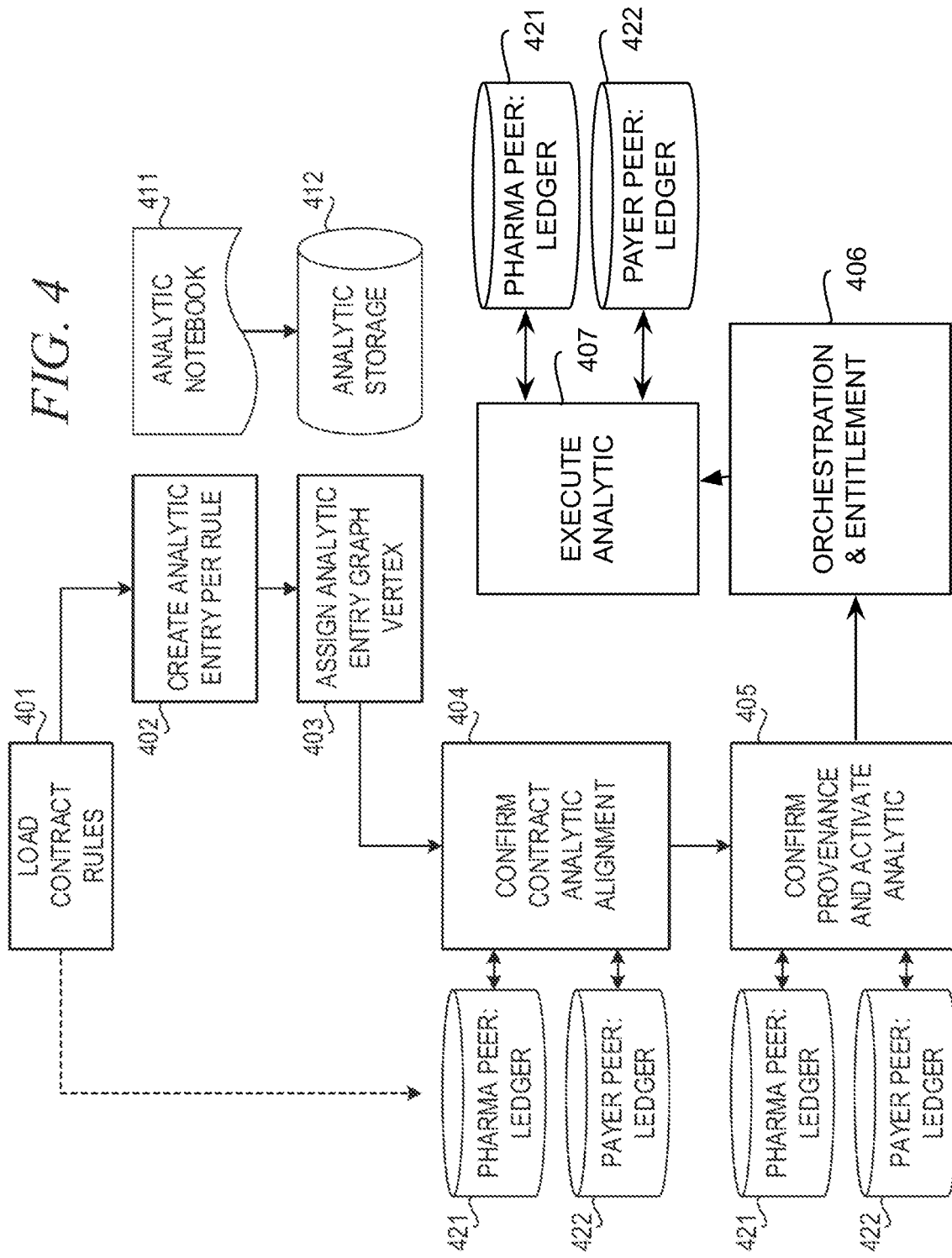
FIG. 4 depicts an operational flow for contract analytic binding and provenance in accordance with an illustrative embodiment.
Figure 7:
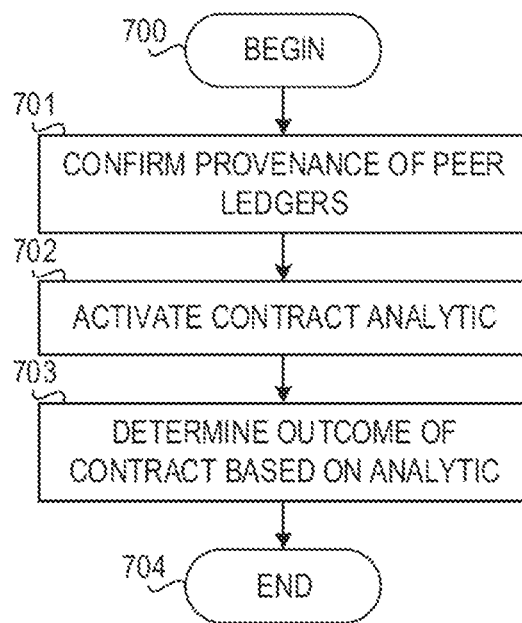
FIG. 7 is a flowchart illustrating operation of a mechanism for contract analytic provenance in accordance with an illustrative embodiment.
Figure 8:
FIG. 8 illustrates a provenance data model in accordance with an illustrative embodiment.
Figure 9:
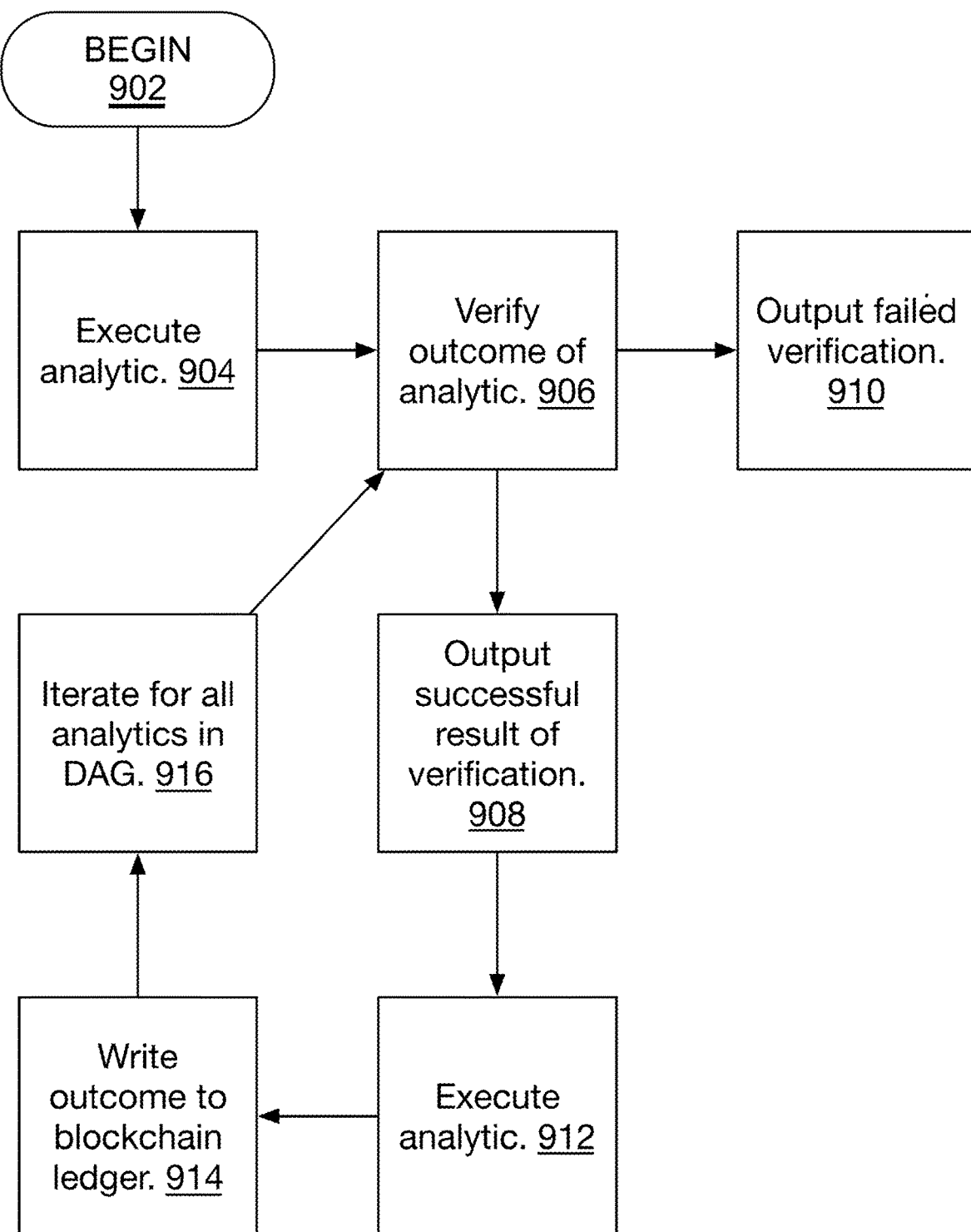
FIG. 9 is a flowchart illustrating operation of a mechanism for verifiably executing a set of analytics in accordance with an illustrative embodiment.

The mechanisms generally have the following three phases: analytic activation (emphasized in FIGS. 1-7), which generates a directed acyclic graph (DAG) where each analytic is represented by a vertex; orchestration and entitlement for analytics and their associated datasets (emphasized in FIG. 10); and analytic execution using outcome verification (emphasized in FIGS. 4, 8 and 9).

The mechanisms for orchestration and entitlement for analytics and their associated datasets (datasets on which the analytics operate) generally provide the following functions: for an analytic to be executed, a source (a data store) of its datasets is identified via one or more immutable entries of a blockchain ledger; the analytic and the dataset are encrypted at the time they are created and stored using their owner's public key. At execution time, the public key is retrieved from the owner to decrypt both the analytic and its dataset. These functions prepare the analytic and its dataset for execution by other mechanisms, described below.

The mechanisms for analytic execution and analytic outcome verification are performed at two points using link data between entries of a provenance data model and entries of a set of other data models pertaining to a contract (attributes data model, outcome data model, and analytic data model). The link data is generated by an analytic engine or loaded from a data store in the blockchain. The links identify the contract to be executed (via a contract id field), it's attributes, the rules to be applied and the analytics that apply the rules, and the data and metrics to be operated upon.

The first mechanism provides analytic outcome verification locally—for each analytic to be executed. Contract analytic binding and provenance system 310 refers to linkage data of FIG. 8 to verify that, for a given contract, the correct analytic is called and the correct data is operated upon to produce a correct outcome. Verification fails if observed linked data fails to match expected linked data.

The second mechanism provides analytic outcome verification globally—for a plurality (i.e., stages of analytic execution) or all of the analytics that collectively make up the contract. Contract analytic binding and provenance system 310 refers to linkage data of FIG. 8 to verify that, for a given contract, all the necessary analytics (or a subset of the analytics) is called and the correct data is operated upon to produce an ultimate contract outcome that in effect executes the contract. Verification fails if observed linked data fails to match expected linked data.

In the case of both the first mechanism and the second mechanism, successful verification results in outcomes of the analytic's (or analytics') execution to be committed to the blockchain network. The blockchain platform then facilitates propagation of the analytic execution across the blockchain network.

Figure 10:
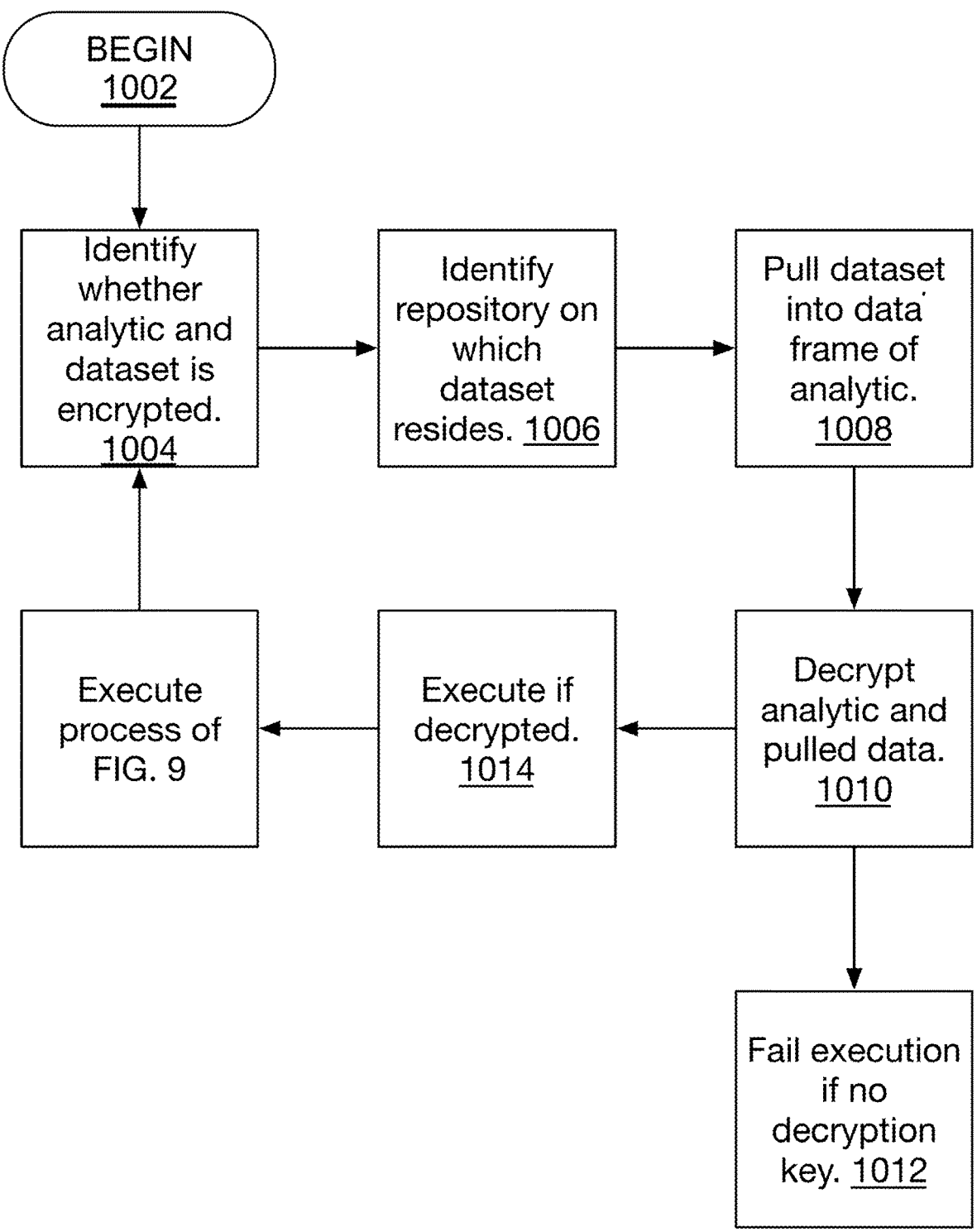
FIG. 10 is a flowchart illustrating operation of a mechanism for orchestrated and entitled execution of a set of analytics in accordance with an embodiment of the invention.

Embodiments of the invention will now be described in connection with the various FIGS. FIGS. 1-7 generally describe a contract analytic binding and provenance system 310 (FIG. 3) that performs the function of analytic activation (functions of analytic execution are discussed tangentially). FIGS. 8-9 generally describe mechanisms by which contract analytic binding and provenance system 310 performs analytic execution with outcome transparency and outcome verification. FIG. 10 generally describes mechanisms by which contract analytic binding and provenance system 310 performs orchestration and entitlement functions for analytics and their associated datasets.

Before discussing additional details of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" regarding particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
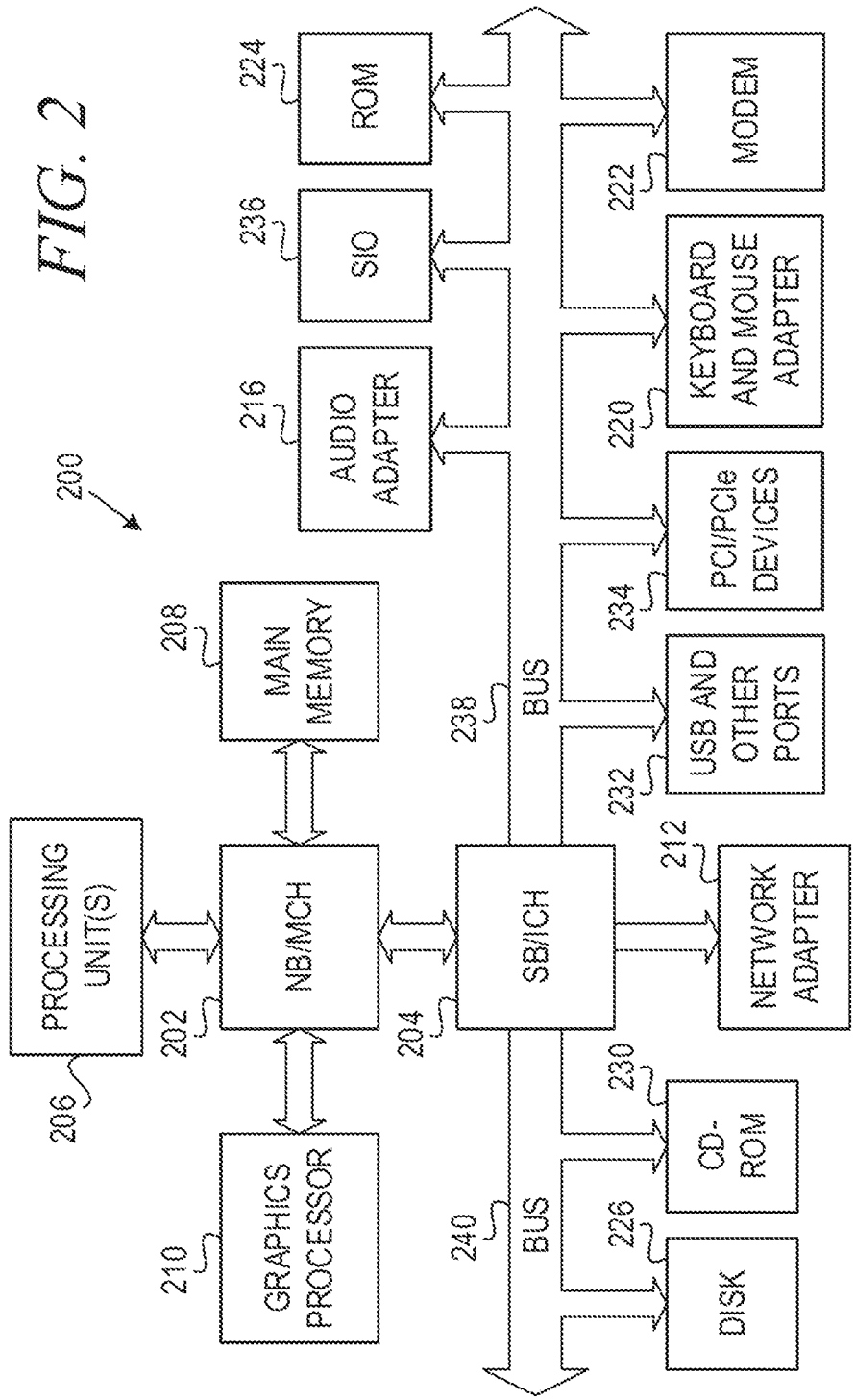
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation regarding the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a system for contract analytic binding and provenance. The configuring of the computing device may comprise the providing of application specific hardware, firmware, or the like to facilitate the performance of the operations and generation of the outputs described herein regarding the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates contract analytic binding and provenance. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the contract analytic binding and provenance system.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating operation of a system for contract analytic binding and provenance in accordance with an illustrative embodiment. Contract analytic binding and provenance system 310 manages a contract between two parties. In the depicted example, the parties are a pharmaceutical company party (pharma) 301 and a health insurance payer party (payer) 302. For instance, the pharmaceutical company 301 my agree to provide a drug that will lower cholesterol in a population for an agreed-upon price, and if the drug does not lower cholesterol by 10% or more, the payer 302 will receive a 5% rebate. In accordance with the illustrative embodiment, contract analytic binding and provenance system uses smart contracts to automatically execute, control, and document legally relevant events and actions according to the terms of the contract or agreement. These events and actions are recorded in ledgers 311, 312 using blockchain technology. That is pharma peer ledger 311 and payer peer ledger 312 provide an immutable record of the contract terms and events that both parties can trust.

While the depicted example is between a pharmaceutical company and a health care payer, the mechanisms of the illustrative embodiments may be applied to any contract or agreement for which the terms and outcome of the agreement are determined using analytics. For example, a contract may define certain rules, such as inclusion criteria, exclusion criteria, and performance outcome. In the above example, the pharmaceutical company agrees to provide a drug that will lower cholesterol in a population, and the inclusion criteria and the exclusion criteria define the population. The parties must agree on these inclusion criteria and exclusion criteria before the contract can be deployed. That is, the parties must agree on which patients are to be included in the analytics and which patients are excluded in the analytics. Furthermore, the parties must agree on how the performance outcome is determined. For instance, in the above example the parties must agree on whether the agreement is satisfied if any 10% decrease in cholesterol occurs or if the lowering of cholesterol must be maintained over a given period of time. These criteria are stored as a set of rules in peer ledgers 311, 312.

Contract analytic binding and provenance system 310 communicates with analytics engine 320 to define and execute the analytics for the contract. Contract analytic binding and provenance system 310 loads the set of rules from peer ledgers 311, 312 and creates an analytic entry for each rule with ordering preserved and associated for the analytic entry. The analytics are associated with executables in analytic notebook 321. As an example, the executables may be a Python® programming language functions in a Jupyter™ Notebook. PYTHON is a registered trademark of the Python Software Foundation (PSF) in the United States, other countries, or both. JUPYTER is a trademark of the NumFOCUS foundation in the United States, other countries, or both. The analytics are executed from analytic notebook 321 against data sets in analytic storage 322, and results are returned to analytics engine 320. The associated analytics are tied to a directed acyclic graph (DAG) vertex as a position in the execution order. A directed acyclic graph is a directed graph with no directed cycles. That is, it consists of vertices and edges, with each edge directed from one vertex to another, such that there is no way to start at any vertex v and follow a consistently directed sequence of edges that eventually loops back to v again.

Analytic storage 322 is a storage for all things related to the analytic execution. Analytic storage 322 includes:

1) Analytic: In this embodiment, the analytic is a Jupyter™ Notebook. In another embodiment, the analytic comprises computer program code deployed in a Kubernetes container. In another embodiment, the analytic is a Web Service (likely deployed in a container), an Apache Spark analytic.

2) The DAG storage for the analytics. This is usually stored in a database (e.g., PostgresSQL or File System).

The DAG is stored in analytic storage 322. At execution time, a representation of what is executed is stored on the ledger and should match the sequence specified in the DAG, so that provenance also must be stored on the blockchain, but perhaps in a simplified form. One way is a hash of the final DAG (taking the DAG storage entry and running a hash on it to produce a hash value to confirm). The DAG may be represented as a data structure and stored on the file system in its simplest form.

Contract analytic binding and provenance system 310 checks the analytic entries against the peer ledgers 311, 312 for the contract and the DAG by parsing the set of rules that are related to the contract, where the rules must be associated with an analytic, and creating an analytic entry per rule tied to the DAG and matching the order in the DAG. Contract analytic binding and provenance system 310 then stores an entry in the peer ledgers activating the contract analytic set defined by the analytic entries.

FIG. 4 depicts an operational flow for contract analytic binding and provenance in accordance with an illustrative embodiment. The contract analytic binding and provenance system loads contract rules (block 401) agreed upon by the parties, which include a pharma party and a payer party in the depicted example. The system creates an analytic entry per rule (block 402). The system uses smart contracts to create an analytic entry that is associated with an executable analytic function, such as a Jupyter™ Notebook (jpynb) version. The system stores as a part of the analytic entry, a reference to the analytic, a hash of the analytic function to serve as a comparison for the function, and an identifier to identify the analytic. The identifier in one embodiment can be the Docker™ image id of the images for the executable analytic. A Docker™ image's ID is a digest, which contains an SHA256 hash of the image's JSON configuration object. Docker™ computer software creates intermediate images during a local image build, for the purposes of maintaining a build cache. An image manifest is created and pushed to a Docker registry when an image is pushed. DOCKER is a trademark of Docker, Inc., in the United States, other countries, or both.

The system then assigns each analytic entry a directed acyclic graph vertex as a position in the execution order (block 403). The system uses smart contracts to store the vertices and edges and paths can be represented as (a, b) in the directed acyclic graph. The path (a, b) is a representation of the edges and the way the graph flows, where (b) is reachable from (a) and b is a direct successor to (a). This allows the system to quickly parse the execution order by confirming the order of vertices to edges in the directed acyclic graph. In another embodiment, a flow executor can execute the entries in the DAG by parsing the data structure for the DAG and executing each analytic based on the vertices and edges.

Next, the system confirms contract analytic alignment (block 404). The system checks the analytic entries against ledger entries in pharma peer ledger 421 and payer peer ledger 422 for the contract and the DAG by parsing the set of rules that are related to the contract. The system checks that the number of applicable rules in a contract are present and represented by vertices in the DAG and where the rules are ordered and checks that the paths align with the edges. As described previously each vertex represents an analytic, and that analytic represents an applicable rule in the contract.

The system confirms provenance and activates the analytic (block 405) by creating an analytic entry per rule tied to the DAG with matching order and storing the entries in pharma peer ledger 421 and payer peer ledger 422. The system receives input representing a set of analytic (Data Model: Analytic) entries that is associated with a contract (Data Model: Contract). The contract has a set of rules (Data Model: Rule) that are defined for the contract. The system receives a representation of the DAG for each analytic and updates the analytic with the vertex and edge information. The system performs a check against the number of rules defined in the contract with the number of analytic entries, confirms that the order matches the DAG and that there is a corresponding analytic executable identified for that analytic. These activities to check and confirm that the data is representative and match expectations from the system confirm that there is provenance in the data representing the contract. The smart contracts execute and calculate this provenance on each peer; consensus is achieved based on the results of the execution of these smart contracts which are the values to be written to the ledger based on the calculations and changes to the data to represent that provenance. Once consensus is reached the data is written to the ledger and is persisted in all the peers of the blockchain network for this contract. As part of this execution the smart contracts activate the contract by updating each analytic entry to set each analytic to activated for an approved contract.

The system orchestrates execution and verifies entitlement for analytics and their associated datasets (block 406). These functions prepare the analytics and their datasets for execution at a later stage (see discussion of block 407). Recall that analytics and their associated datasets have owners. An owner of the analytic or dataset may be, for example, a party to the contract; i.e., one of the peers. In the depicted embodiment, each of the payer and pharma peer is an owner of a set of analytics and some datasets. Prior to the system executing the analytics, each analytic (or each analytic that should be executed securely) are encrypted and stored in analytic storage 412 using their owners' cryptographic key. For example, "analytic 1" (not shown) belonging to the pharma peer 301 (FIG. 3) is encrypted using pharma peer's 301 key and stored in analytic storage 412. The same process is applied to datasets on which analytic 1 operates. In an embodiment, the entire dataset is encrypted. In another embodiment, only a subset of the dataset is encrypted. The same processes may be applied to other analytics and other datasets for which the payer peer 302 (or another entity) is the owner. In an embodiment, the encrypted analytics source or analytic are part of analytic notebook 411 stored in analytic storage 412. The datasets have credential access to the data sources that will be utilized at orchestration time to inject the credentials into an analytic at execution time.

The system orchestrates entitled analytic execution (at block 406) at execution time by identifying, via entries in one or more blockchain ledgers, the data source for the analytic and the dataset to be operated on by the analytic. In some embodiments, the dataset is or includes edge data, meaning that it is stored in a repository (not shown) not immediately available to the processing system. Using entries of the blockchain, the source is identified. Thereafter, the system checks, for each vertex in the DAG whose source has been identified, whether the analytic represented by the vertex is encrypted; and if so, decrypts the analytic using the decryption key, if available; and otherwise fails execution. The analytics are then injected with credentials for dataset access and decryption keys for the dataset. The decrypted analytics (which already were activated) are now entitled for execution (i.e., the processing system has permission) to execute them, as described below.

The system executes activated analytics (block 407). Each analytic that executes generates a corresponding outcome. The outcome may can be written to pharma peer ledger 421 and payer peer ledger 422. As described throughout this disclosure, the prior art does not provide any mechanism for verifying these outcomes (because there is no provenance or transparency) before they are committed to peer ledgers. Embodiments of the invention described in connection with FIGS. 8-9, on the other hand, perform outcome verification using provenance information that provides transparency into how an outcome is generated and whether it is a correct outcome. A correct outcome is one which is produced by an analytic that the contract parties intended to execute by applying agreed upon metrics to data the parties intended to process. Additional details are provided in connection with FIGS. 8-9.

Figure 5:
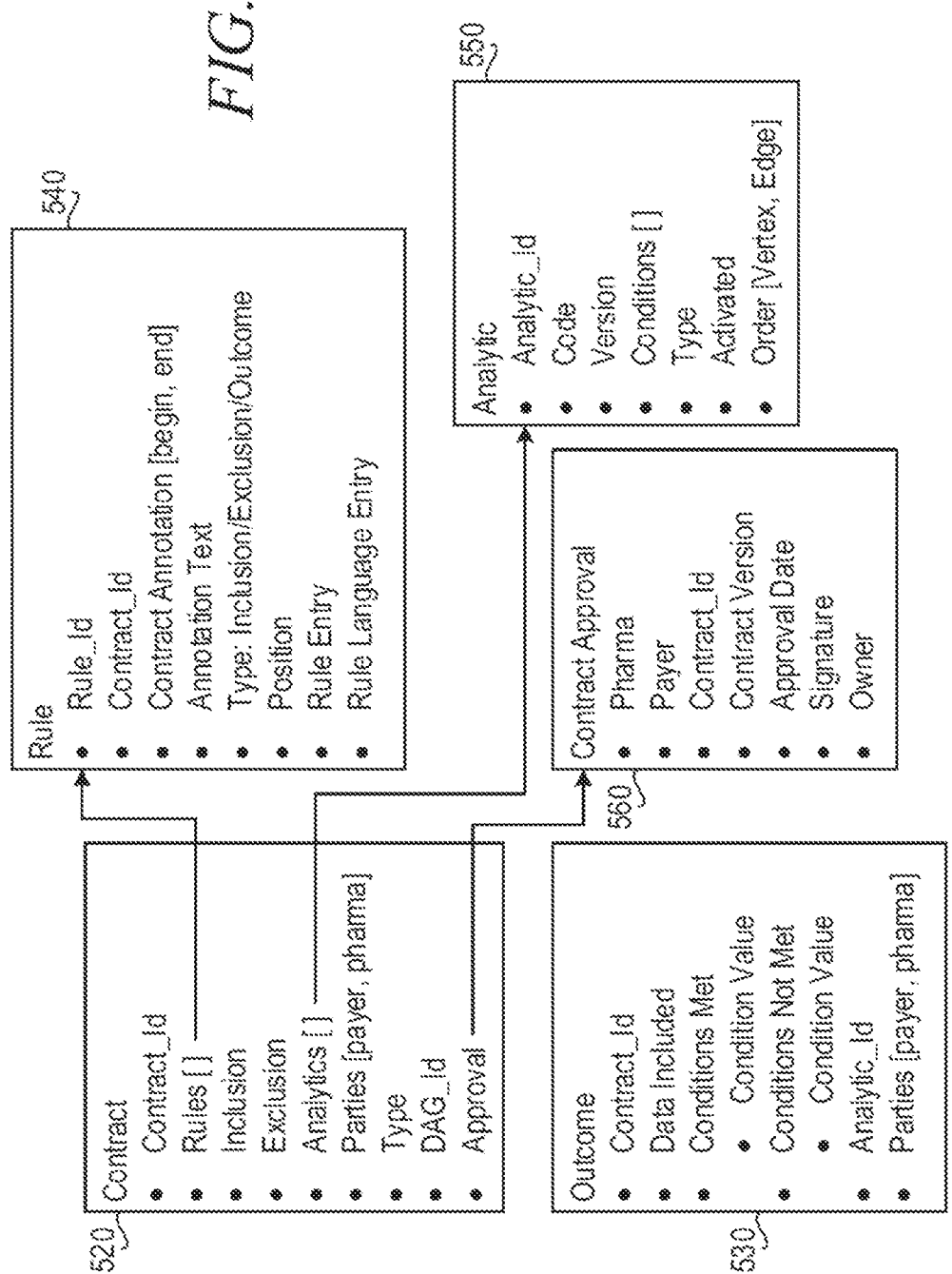
FIG. 5 illustrates data models for contract model provenance and confirmation in accordance with an illustrative embodiment.

FIG. 5 illustrates data models for contract model provenance and confirmation in accordance with an illustrative embodiment. In the data models of FIG. 5, hashes of all data categories are stored on the ledger. Consolidated provenance data are linked to the contract. The lifecycle of the contract is as follows:
1. Contract
2. Data provenance
3. Analytic
4. Outcome The data models store representations of data including incorrect data, data included, the owner, the parties of the contract, and the contract identifier. The data models may also be referred to as data model records, which illustrates that they are data structures stored on a tangible storage device, such as peer ledgers or other storage components. In the depicted example, the owner is "payer," and the parties are "payer" and "pharma." The data are pointers or hashes of the data rather than the data itself. Contract data model 520 stores the contract identifier, a set of rules, inclusion criteria, exclusion criteria, analytics to be executed, the parties, and a directed acyclic graph (DAG) identifier. The set of rules point to one or more rule data models 540. The analytics field points to at least one analytic data model 540.

Outcome data model 530 stores the contract identifier, data included, conditions met, conditions not met, an analytic identifier, and the parties of the contract. The conditions met field stores a condition value. The conditions not met field also stores a condition value. Each condition would have a value, whether it is met or not met.

Rule data model 540 stores a rule identifier, a contract identifier, a contract annotation, annotation text, a rule type, a position, a rule entry, and rule language entry. The rule type may be one of the following: inclusion, exclusion, or outcome. Position is where in the list of rules this is located from reading the contract, $1^{st}$, $4^{th}$, $5^{th}$, etc. Rule Entry is the actual rule defined in a machine-readable form, examples could be a Python™ expression. Contract Annotation is the text covered by the rule, the begin and end on a specific line of the contract. Annotation Text is the actual text found in the contract. Rule Language Entry is the expression language, could be python, pseudo-code, java, j son, etc.

Analytic data model 550 stores the analytic identifier, a hash of the code of the analytic, a version of the analytic, a set of conditions, a type, an activated field, and an order. The code field stores a hash of the code or a pointer to the code of the analytic.

In contract data model 520, the approval field points to contract approval data model 560, which stores a pharma field and a payer field to identify the parties of the contract, a contract identifier, a contract version, an approval date, a signature, and an owner. The signature field holds the public cryptographic signature for the approver of the contract. The contract version is a number or identifier representing the version of the contract, this can be alpha-numeric or numeric.

Figure 6:
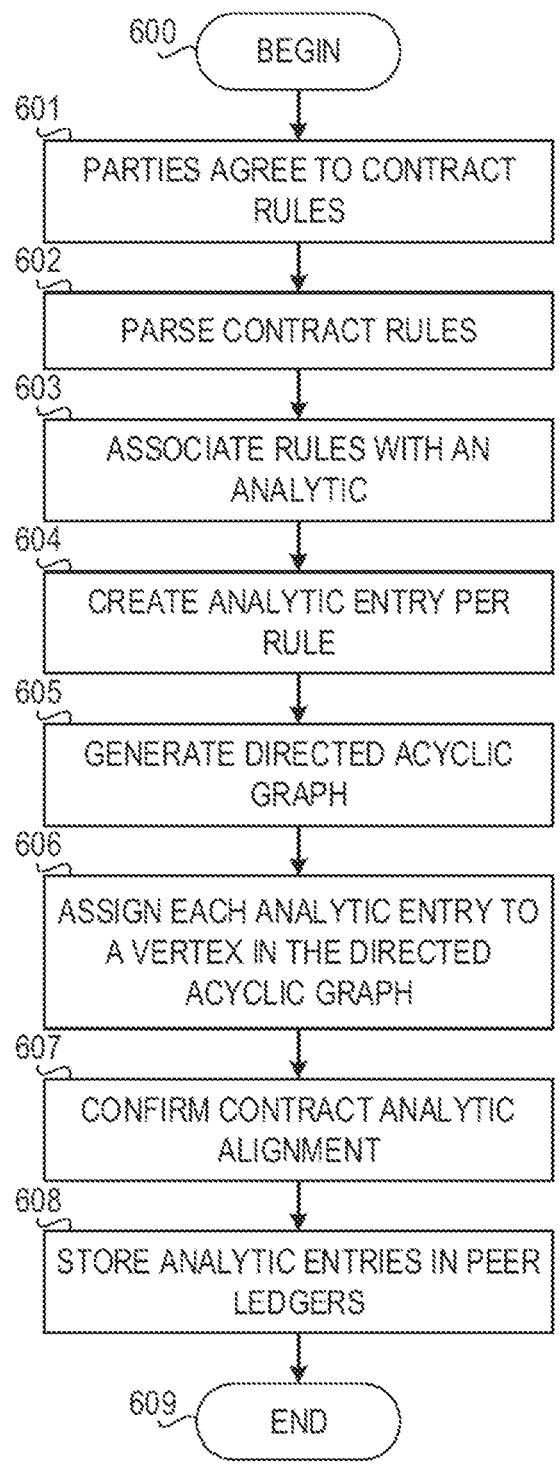
FIG. 6 is a flowchart illustrating operation of a mechanism for contract analytic binding in accordance with an illustrative embodiment.

FIG. 6 is a flowchart illustrating operation of a mechanism (algorithm/component) for contract analytic binding in accordance with an illustrative embodiment. Operation begins (block 600), and the parties agree to contract rules (block 601). The mechanism parses the contract rules (block 602), associates the rules with analytics (block 603), and creates an analytic entry per rule (block 604). The mechanism generates a directed acyclic graph (DAG) (block 605) and assigns each analytic entry to a vertex in the directed acyclic graph (block 606).

Then, the mechanism (algorithm/component) confirms the contract analytic alignment (block 607). The mechanism stores the analytic entries in the peer ledgers (block 608). Thereafter, operation ends (block 609).

FIG. 7 is a flowchart illustrating operation of a mechanism for contract analytic provenance in accordance with an illustrative embodiment. Operation begins (block 700), and the mechanism confirms provenance of the peer ledgers (block 701). The mechanism then activates the contract analytic (block 702) and determines the outcome of the contract based on the analytic (block 703). Thereafter, operation ends (block 704).

FIG. 8 illustrates a provenance data model in accordance with an illustrative embodiment. More specifically, FIG. 8 depicts a provenance data model 880 with associations of the data (i.e., its provenance) to a contract attributes data model 820, an outcome data model 830, and an analytic data model 850. Aspects of FIG. 8 are similar to similarly numbered elements in FIG. 5; definitions in FIG. 5 can be references for similarly named elements used in FIG. 8.

In the data models of FIG. 8, hashes of all data categories are stored on the ledger. Consolidated provenance data are linked to the contract. As a reminder (see FIG. 5), the lifecycle of the contract is as follows:

1. Contract
2. Data provenance
3. Analytic
4. Outcome

Provenance data model 880 stores representations of data including raw data received, validated data, incorrect data, data included, data excluded, owner, parties, analytic ID and contract ID. In the depicted example, the owner is "payer," and the parties are "payer" and "pharma." The data are pointers or hashes of the data rather than the data itself.

Contract attributes data model 820 stores representations of data including a contract ID, rules, inclusion rules, exclusion rules, analytics ID(s), and the parties (here, "pharma" and "payer").

Outcome data model 830 stores representations of data including a contract ID, data included, conditions met (and condition values), conditions not met (and condition values), analytics ID(s), and parties (here, "pharma" and "payer").

Analytics data model 850 stores representations of data including an analytics ID, code data, version data, conditions data, and type data.

In the depicted embodiment, provenance data model 880 is linked to a contract attributes data model 820; an outcome data model 830; and an analytic data model 850. Contract attributes data model 820 is additionally linked to analytic data model 850. Outcome data model 830 is additionally linked to analytic data model 850.

The data models and links between them in FIG. 8 are defined as part of the contract and are stored on a ledger in the blockchain network. They are referenced by embodiments of the invention at execution time for an analytic under consideration to verify whether that analytic is linked to the correct outcome and attributes. The defined data models and links can be referred to as expected data models and expected links; and those seen in the analytic under consideration at execution time can be referred to as observed data models and observed links.

With continued reference to the illustrative embodiment of FIG. 8, the various data models and links across them provide a mechanism for providing a data provenance record to be generated, stored, and linked (via provenance data model 880) between a contract (via contract attributes data model 820), its outcome (via outcome data model 830), and the analytics (analytic data model 850) used to determine the outcome. This linkage data can then be referenced to verify provenance and provide transparency when executing analytics and verifying their outcomes.

Accordingly, the provenance record allows analytics execution on a blockchain network to occur transparently, securely, and verifiably. This is because, in a blockchain network, each peer executes the smart contract, and the peers must be in agreement. They cannot reliably be in agreement about contract execution without the provenance record (i.e., without transparency of the underlying data and the analytics). The data models of FIG. 8 provide the mechanism through which an execution outcome can be reliably evaluated (i.e., the outcome is said to be transparent) by accessing and verifying the data and the analytics used to reach that outcome.

Consider the following illustrative example of analytics execution. Assume that two peers—a payer and a pharma—decide to execute a smart contract with associated data models as defined in FIGS. 5 and 8. Assume that contract analytic binding and provenance system 301 (FIG. 3) receives a raw dataset comprising 800,000 payer claims. Contract analytic binding and provenance system 310 must determine, by processing the claims data using analytics, whether certain conditions were met and whether certain outcomes were achieved so as to trigger contract obligations between the parties.

Consensus is achieved when embodiments of the invention are used to verify aspects of analytics execution using provenance and transparency provided by the embodiments. Recall that during contract execution (FIGS. 1-7), data is repeatedly written to peer ledgers (e.g., pharma peer ledger 301 and payer peer ledger 302 of FIG. 3, or pharma peer ledger 421 or payer peer ledger 422 of FIG. 4). The end results of the processes are stored in the ledgers (for example, see step 608 of FIG. 6 and step 703 of FIG. 7).

Verifying the outcomes—i.e., that the 800,000 claims dataset was processed properly—is too large a task to perform manually or with existing computer systems. Improvements to computing techniques are needed to solve this the technical challenge. Using embodiments of the invention, the claims in the claims dataset are validated, with incorrect claims data being removed (identified via some rules/analytics). The validated data may further be divided into sets of included and excluded data (i.e., included or excluded from the outcome data) based on one or more rules; the rules being applied to the validated data by activating and then executing a corresponding analytic as described in connection with FIGS. 1-7 (e.g., claims from patients over 18 are included, others are excluded). The parties of the contract are also noted.

During this process, each time an outcome is generated (block 407 in FIG. 4), contract analytic binding and provenance system 310 (FIG. 3) can check the data links in the data models of FIG. 8. Any discrepancy results in a failure to reach consensus, and the contract fails to execute. Furthermore, outcomes are verified and evaluated based on the linkage information in the provenance record.

As an example of why a discrepancy may occur, consider the following scenario. Assume that analytics of a contract are executed using a claim set. Assume that claims should be validated using a version of an analytic agreed upon in the parties' contract; assume further that in fact an updated version of the analytic is used to validate the claims dataset. The provenance data model 880 would expect to point to records that indicate the expected analytic_id, but in fact discover that another analytic_id is activated in the DAG for execution. This would create a discrepancy in the provenance data model 880 record and lead to contract execution failure.

In this manner, maintaining provenance information as provided in FIG. 8 allows the parties to interrogate the underlying data and analytics that govern smart contract execution and reach consensus at time of execution. Therefore, if an outdated version of an analytic is used, this would be revealed by interrogating the provenance record.

This automatic, unsupervised, and quick identification and evaluation of outcomes is a greatly beneficial outcome, particularly in the above example, where there are 800,000 claims.

This is a clear advantage over the prior art, where an important limitation is that there is no simultaneous agreement and check against an immutable record that specifies exactly what analytic is run on what data applying what metrics.

An advantage of some embodiments of the invention is, therefore, the function of providing a data provenance record linked to analytics records which ensures that the data provenance information and the analytics are in agreement and align with the eventual outcome before commitment to blockchain ledgers.

FIG. 9 is a flowchart illustrating operation of a mechanism for executing a set of analytics, according to an embodiment of the invention. The mechanism of FIG. 9 can be implemented as programming instructions stored on one or more tangible storage media of one or more computing systems to perform one or more methods. In an embodiment, the mechanism of FIG. 9 is implemented by contract analytic binding and provenance system 310 (FIG. 3) using data models and data model records depicted in FIGS. 5 and 8.

Referring now to FIGS. 3, 5, 8, and 9, the mechanism begins at step 902 whereby contract analytic binding and provenance system 310 begins to execute an analytic (or a set of analytics). The analytics are represented by vertices in a directed acyclic graph (DAG) (see FIGS. 3-4). The analytics may have associated analytic data models (e.g., analytic data model 550 or analytic data model 850). As a reminder, and as previously described in connection with FIG. 5, above, data models may also be referred to as data model records, which illustrates that they are data structures stored on a tangible storage device, such as peer ledgers or other storage components. The analytics may be processes as described in connection with FIGS. 4, 6, and 7 to produce an outcome data model 530 and/or outcome data model 830.

Contract analytic binding and provenance system 310 receives (at block 904) a programming instruction to execute the analytic represented as a vertex in a directed acyclic graph (DAG) data structure. The instruction may arrive from a process that is internal or external to contract analytic binding and provenance system 310. In one example, it may be performed at block 407 in FIG. 4 each time an analytic is activated for execution and before its outcome is written to a blockchain ledger. In an embodiment, receiving the instruction (block 904) includes receiving a contract outcome data model from a datastore for verification.

Contract analytic binding and provenance system 310 verifies (block 906) an outcome of the analytic by evaluating observed links of the analytic with one or more data models compared to expected links between the analytic and one or more data models, wherein the one or more data models include a provenance data model. In other words, contract analytic binding and provenance system 310 uses the provenance information as provided in FIG. 8 to determine whether the analytic under consideration is correct relative to the contract which is being executed (by checking contract id entries across the data models represented in FIG. 8); whether the data included is consistent and correct; and whether the right analytic (including the right version is executed).

Therefore, in an embodiment, the one or more data models may be a contract attributes data model which includes an array of analytics for the contract under execution; a contract outcome data model; an analytic data model; or a combination thereof, as shown in in FIG. 8. Each analytic may have a corresponding provenance data model and an analytic model.

In an embodiment, verifying (step 906) the outcome includes verifying that a validated data entry of the provenance data model matches a corresponding validated data entry of an outcome data model. In an embodiment, verifying (step 906) the outcome includes verifying that a condition met entry of the outcome data model matches a corresponding conditions entry of an analytic data model. In an embodiment, the analytic is associated with a contract, and verifying (step 906) the outcome includes verifying that a contract identification for the contract and the analytic are consistent across the provenance data model and the one or more data models.

In an embodiment, verifying (step 906) fails based on contract analytic binding and provenance system 310 determining that attributes of a provenance data model differ from correlated data in the outcome attributes and agreement with the contract attributes.

In an embodiment, the verifying (step 906) succeeds based on contract analytic binding and provenance system 310 determining that links observed between the data models of the analytic under consideration, as reflected in FIG. 8, are as expected. Upon successful verification, contract analytic binding and provenance system 310 outputs (step 908) to a system or a user the result of the verification indicating the provenance and outcomes are in agreement based on the validation of all data models.

In an embodiment, verifying (step 906) fails and contract analytic binding and provenance system 310 outputs (step 910) to a system or a user a result of the verification indicating at least one discrepancy between at least one observed link and one expected link in the links between data models of FIG. 8.

In an embodiment, the verification (step 906) succeeds, and contract analytic binding and provenance system 310 executes (step 912) the analytic and writes (step 914) the outcome of the analytic to a blockchain ledger.

In an embodiment, contract analytic binding and provenance system 310 iteratively verifies (step 906) all analytics in the set of analytics in the DAG according to their defined execution order, and verifies (step 916) that all analytics for the contract at issue are verified and executed and iteratively writes outcomes of all verified and executed analytics to a blockchain ledger; whereby the contract is executed.

verifying an execution outcome of a set of analytics in accordance with an illustrative embodiment. The mechanism of FIG. 9 can be implemented as programming instructions stored on one or more tangible storage media of one or more computing systems to perform one or more methods. In an embodiment, the mechanism of FIG. 9 is implemented by contract analytic binding and provenance system 310 (FIG. 3) using data models and data model records depicted in FIGS. 5 and 8.

FIG. 10 is a flowchart illustrating operation of a mechanism for orchestrated and entitled execution of a set of analytics in accordance with an embodiment of the invention. The mechanism of FIG. 10 can be implemented as programming instructions stored on one or more tangible storage media of one or more computing systems to perform one or more methods. In an embodiment, the mechanism of FIG. 10 is implemented by contract analytic binding and provenance system 310 (FIG. 3) using the directed acyclic graph (DAG) and other data of FIG. 4.

Referring now to FIGS. 3, 4, and 10, the mechanism begins at step 1002 whereby contract analytic binding and provenance system 310 begins to orchestrate entitled execution of an analytic (or a set of analytics) represented by one or more vertices in the DAG.

Contract analytic binding and provenance system 310 identifies (step 1004), for each analytic under consideration, whether it is encrypted. The process repeats for any dataset associated with the analytic.

Contract analytic binding and provenance system 310 identifies (step 1006) the repository on which the dataset resides, using entries in the blockchain ledger (accessible by the system and by the peers), and pulls (step 1008) the dataset into the data frame for the analytic in the analytic workflow execution process.

Contract analytic binding and provenance system 310 decrypts (step 1010) the analytic and the pulled data using the decryption key. If the decryption key is unavailable, execution fails (step 1012). The failed execution can be reported to another system, process, or user.

If the decryption key is available and decryption success, the analytics are executed (step 1014) as described in FIG. 9.

In an embodiment, the process of FIG. 10 may be repeated for all analytics in the DAG before beginning execution according to the process of FIG. 9; or the process of FIG. 10 may execute for an analytic on a dataset, and processing may move to FIG. 9 (i.e., the analytic is executed), and the process of FIG. 10 starts again for a next analytic in the DAG.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for orchestrating entitled execution of a set of analytics, the method comprising:
    retrieving an analytic entry from an immutable data record source;
    identifying an analytic associated with the analytic entry, wherein the analytic is encrypted using an owner's key;
    decrypting the analytic using a decryption key;
    executing the analytic based on the decrypting:
        identifying a dataset associated with the analytic, wherein the dataset is encrypted using the owner's key;
        decrypting the dataset using the decryption key;
        finding a directed acyclic graph (DAG) workflow execution associated with an immutable data record, wherein the DAG comprises vertices including a vertex corresponding to the analytic;
        verifying a vertex order and analytic function using the DAG;

activating the analytic; and
executing the analytic based on the decrypting of the analytic and based on decrypting the dataset.

2. The method of claim 1, further comprising:
identifying the dataset associated with the analytic, wherein the dataset is encrypted using the owner's key;
decrypting the dataset using the decryption key; and
executing the analytic based on the decrypting of the dataset.

3. The method of claim 1, further comprising:
finding the DAG workflow execution associated with the immutable data record, wherein the DAG comprises the vertices including the vertex corresponding to the analytic; and
verifying the vertex order and analytic function using the DAG.

4. The method of claim 1, further comprising:
activating the analytic.

5. The method of claim 1, wherein the method iteratively executes for all analytics in a set of analytics according to the workflow execution of the DAG using authenticated and authorized data access credentials.

6. The method of claim 1, wherein execution of the analytic fails based on the decrypting failing.

7. The method of claim 2, wherein execution of the analytic fails based on the decrypting of the dataset failing.

8. The method of claim 1, further comprising:
activating the associated analytic for execution with data access credentials, wherein the activating comprises configuring credentialed access to edge data.

9. A computer program product for orchestrating entitled execution of a set of analytics, the computer program product comprising one or more computer-readable storage media having computer-readable program instructions embodied therewith for execution by one or more processors of one or more computers, the computer-readable program instructions comprising instructions for:
retrieving, by the one or more processors, an analytic entry from an immutable data record source;
identifying, by the one or more processors, an analytic associated with the analytic entry, wherein the analytic is encrypted using an owner's key;
decrypting, by the one or more processors, the analytic using a decryption key;
executing, by the one or more processors, the analytic based on the decrypting;
identifying, by the one or more processors, a dataset associated with the analytic, wherein the dataset is encrypted using the owner's key;
decrypting, by the one or more processors, the dataset using the decryption key;
finding, by the one or more processors, a directed acyclic graph (DAG) workflow execution associated with an immutable data record, wherein the DAG comprises vertices including a vertex corresponding to the analytic;
verifying, by the one or more processors, a vertex order and analytic function using the DAG;
activating the analytic, by the one or more processors; and
executing, by the one or more processors, the analytic based on the decrypting of the analytic and based on decrypting the dataset.

10. The computer program product of claim 9, the programming instructions further comprising instructions for:
identifying, by the one or more processors, a dataset associated with the analytic, wherein the dataset is encrypted using the owner's key;
decrypting the dataset using the decryption key; and
executing the analytic based on the decrypting of the dataset.

11. The computer program product of claim 10, wherein execution of the analytic fails based on the decrypting of the dataset failing.

12. The computer program product of claim 9, the programming instructions further comprising instructions for:
finding, by the one or more processors, the DAG workflow execution associated with the immutable data record, wherein the DAG comprises vertices including a vertex corresponding to the analytic; and
verifying the vertex order and analytic function using the DAG.

13. The computer program product of claim 9, the programming instructions further comprising instructions for:
activating the analytic, by the one or more processors.

14. The computer program product of claim 9, wherein the method iteratively executes, by the one or more processors, for all analytics in a set of analytics according to the workflow execution of the DAG using authenticated and authorized data access credentials.

15. The computer program product of claim 9, wherein execution of the analytic fails based on the decrypting failing.

16. The computer program product of claim 9, the programming instructions further comprising instructions for:
activating, by the one or more processors, the associated analytic for execution with data access credentials, wherein the activating comprises configuring credentialed access to edge data.

17. A computer system for orchestrating entitled execution of a set of analytics, the computer system comprising one or more processors and one or more tangible storage media storing programming instructions for execution by the one or more processors, the program instructions comprising instructions for:
retrieving, by the one or more processors, an analytic entry from an immutable data record source;
identifying, by the one or more processors, an analytic associated with the analytic entry, wherein the analytic is encrypted using an owner's key;
decrypting, by the one or more processors, the analytic using a decryption key;
executing, by the one or more processors, the analytic based on the decrypting;
identifying, by the one or more processors, a dataset associated with the analytic, wherein the dataset is encrypted using the owner's key;
decrypting, by the one or more processors, the dataset using the decryption key;
finding, by the one or more processors, a directed acyclic graph (DAG) workflow execution associated with an immutable data record, wherein the DAG comprises vertices including a vertex corresponding to the analytic;
verifying, by the one or more processors, a vertex order and analytic function using the DAG;
activating the analytic, by the one or more processors; and
executing, by the one or more processors, the analytic based on the decrypting of the analytic and based on decrypting the dataset.

* * * * *